(12) United States Patent
Narayanaswamy et al.

(10) Patent No.: US 8,775,625 B2
(45) Date of Patent: Jul. 8, 2014

(54) VIRTUAL MACHINE MOBILITY IN DATA CENTERS

(75) Inventors: Krishna Narayanaswamy, Saratoga, CA (US); Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 360 days.

(21) Appl. No.: 12/816,638

(22) Filed: Jun. 16, 2010

(65) Prior Publication Data

US 2011/0314155 A1 Dec. 22, 2011

(51) Int. Cl.
*G06F 15/173* (2006.01)
(52) U.S. Cl.
USPC .......................................................... 709/226
(58) Field of Classification Search
CPC .... G06F 9/4856; G06F 9/45558; H04L 67/34
USPC .......................................................... 709/226
See application file for complete search history.

(56) References Cited

U.S. PATENT DOCUMENTS

| | | | | |
|---|---|---|---|---|
| 7,761,573 | B2 * | 7/2010 | Travostino et al. | 709/226 |
| 8,027,354 | B1 * | 9/2011 | Portolani et al. | 370/431 |
| 2007/0180436 | A1 * | 8/2007 | Travostino et al. | 717/138 |
| 2007/0239979 | A1 * | 10/2007 | Berger et al. | 713/150 |
| 2009/0182778 | A1 * | 7/2009 | Tormasov | 707/200 |
| 2009/0248845 | A1 * | 10/2009 | Waltermann et al. | 709/223 |
| 2010/0070978 | A1 * | 3/2010 | Chawla et al. | 718/105 |
| 2010/0250785 | A1 * | 9/2010 | Shin et al. | 710/3 |
| 2011/0004735 | A1 * | 1/2011 | Arroyo et al. | 711/162 |
| 2011/0040812 | A1 * | 2/2011 | Phillips | 707/822 |
| 2011/0055299 | A1 * | 3/2011 | Phillips | 707/827 |
| 2011/0061045 | A1 * | 3/2011 | Phillips | 717/173 |
| 2011/0061046 | A1 * | 3/2011 | Phillips | 717/176 |
| 2011/0126207 | A1 * | 5/2011 | Wipfel et al. | 718/104 |
| 2011/0145555 | A1 * | 6/2011 | Nayar et al. | 713/1 |
| 2011/0184993 | A1 * | 7/2011 | Chawla et al. | 707/802 |
| 2011/0185292 | A1 * | 7/2011 | Chawla et al. | 715/760 |
| 2011/0251992 | A1 * | 10/2011 | Bethlehem et al. | 707/610 |
| 2011/0276963 | A1 * | 11/2011 | Wu et al. | 718/1 |
| 2011/0295901 | A9 * | 12/2011 | Tormasov | 707/793 |

OTHER PUBLICATIONS

VMware VMotion, "Live Migration for Virtual machines Without Service Interruption," Product Datasheet, printed on Jun. 16, 2010, 2 pages.

* cited by examiner

*Primary Examiner* — Rupal Dharia
*Assistant Examiner* — Marcus McKenzie
(74) *Attorney, Agent, or Firm* — Harrity & Harrity, LLP

(57) ABSTRACT

A data center management device determines that a virtual machine should be moved from a first physical system to a second physical system. The data center management device instructs a first service appliance at the first physical system to perform state synchronization with a second service appliance at the second physical system in order to continue providing the services offered prior to the move. The data center management device instructs the virtual machine to be instantiated at the second physical system.

21 Claims, 8 Drawing Sheets

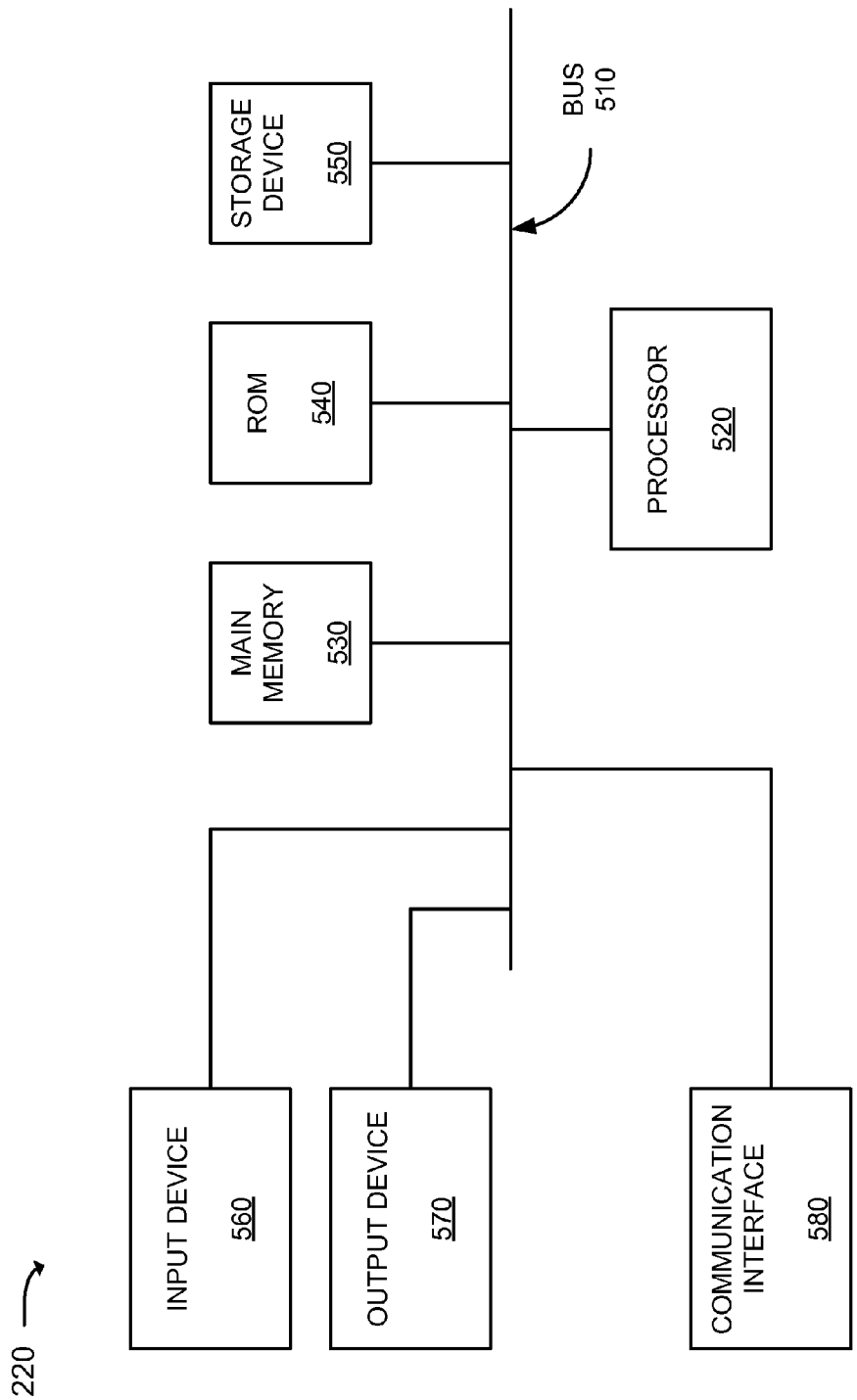

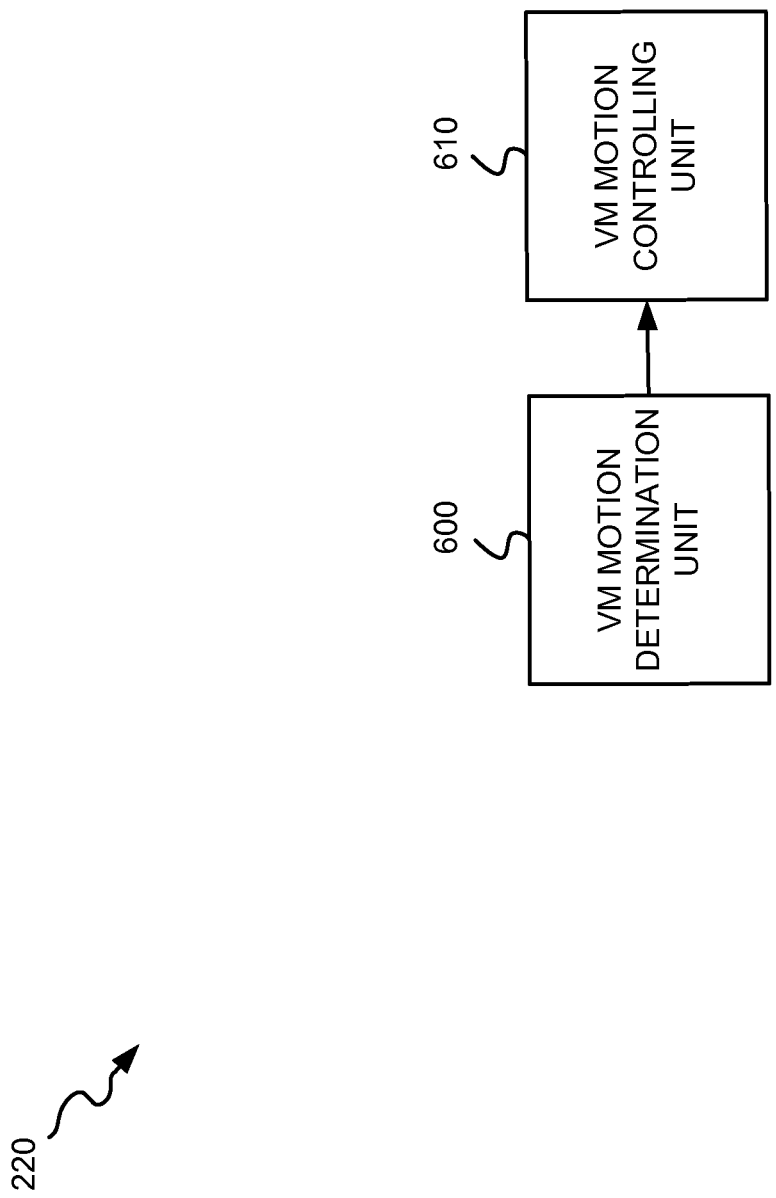

VIRTUAL MACHINE MOBILITY IN DATA CENTERS

BACKGROUND

Data centers include facilities that are used to house computer systems and associated components, including telecommunications and storage systems. Data centers typically contain a set of routers and/or switches that transport traffic between the computer systems and external networks. A data center typically runs applications which handle the business and data of an organization. Components of the applications are databases, file servers, application servers, and other types of components.

Consolidation of data centers is one new approach being taken in the Information Technology (IT) industry. Consolidation of data centers involves the centralization of data centers in "mega data centers." These mega data centers are changing the paradigm of computing from one of local computing to distant or cloud-based computing (e.g., "cloud computing"). Cloud computing involves the provision of dynamically scalable, and possibly virtualized resources, as a service over the Internet.

Along with the consolidation of data centers into mega data centers, another trend in the IT industry is the virtualization of multi-core Central Processing Units (CPUs) to run multiple, independent virtual systems. Virtualized CPUs may implement multiple "virtual machines." Each virtual machine includes a software implementation of a machine that executes programs like a physical machine. A virtual machine may include two different types of virtual machines: a system virtual machine that provides a system platform that supports the execution of a complete operating system; and a process virtual machine that is designed to run a single program. The software running in a virtual machine is limited to the resources and abstractions provided by the virtual machine.

SUMMARY

In accordance with one embodiment, a method may include determining, at a data center management device, that a virtual machine should be moved from a first physical system to a second physical system. The method may further include sending, from the data center management device, a first set of instructions to service appliances at the first and second physical systems to perform state synchronization with one another. The method may additionally include sending, from the data center management device, a second set of instructions to instantiate a copy of the virtual machine in the second physical system. The method may further include shutting down the virtual machine in the first physical system.

In another implementation, a device may include a memory configured to store instructions. The device may further include a processor configured to execute the instructions to: determine that a virtual machine should be moved from a first physical system to a second physical system, instruct a first service appliance at the first physical system to perform state synchronization with a second service appliance at the second physical system, where the first and second service appliances implement at least one of a firewall service, an Internet Protocol Security (IPSec) service, a Virtual Private Network (VPN) service, a Wide Area Network (WAN) optimization service, a load balancing service, an Intrusion Detection and Prevention (IDP) service, or a Unified Threat Management (UTM) service; and cause a copy of the virtual machine at the first physical system to be instantiated at the second physical system.

In an additional implementation, a data center may include at least one server configured to implement a virtual machine, where the virtual machine handles a session at a first data center. The data center may further include a service appliance configured to execute a service related to the session, where the service includes one of a firewall service, an Internet Protocol Security (IPSec) service, a Virtual Private Network (VPN) service, a Wide Area Network (WAN) optimization service, a load balancing service, an Intrusion Detection and Prevention (IDP) service, or a Unified Threat Management (UTM) service, where the service appliance receives first instructions to perform on-demand state synchronization for the virtual machine with another service appliance in a second data center, and performs the state synchronization with the other service appliance based on the received first instructions, and where the virtual machine receives second instructions to cause a copy of the virtual machine to be instantiated at a server at the second data center.

BRIEF DESCRIPTION OF THE DRAWINGS

The accompanying drawings, which are incorporated in and constitute a part of this specification, illustrate one or more embodiments described herein and, together with the description, explain the invention. In the drawings.

FIG. 5 is a diagram of example components of the data center management device of FIG. 2;

FIG. 6 is a diagram that depicts example functional components of the data center management device of FIG. 2.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Virtualization has many benefits, including the ability to move running virtual machines from one physical system to another. This movement of virtual machines is called virtual machine mobility. Within a data center, virtual machines can be moved to better utilize underlying physical machines and, in addition, to save on power and cooling costs. Using inter-data center mobility, it is also possible to distribute load during peak hours and also to handle disaster recovery situations.

Service appliances play an important role in consolidated data centers. Service appliances provide various services in a data center, including, for example, security services such as firewall services, Virtual Private Network (VPN) services, and/or Intrusion Detection and Prevention (IDP) services or other services, including, for example, Wide Area Network (WAN) optimization services, Unified Threat Management (UTM) services, and/or server load balancing services. In order for the data center service appliances to be effective, the data center service appliances need to handle virtual machine mobility between data centers. Almost all service appliances that operate within data centers are stateful in nature and require session and application state information to function properly. Embodiments described herein enable state synchronization between service appliances in separate data centers when a virtual machine moves between the data centers.

Overview

Figure 1:
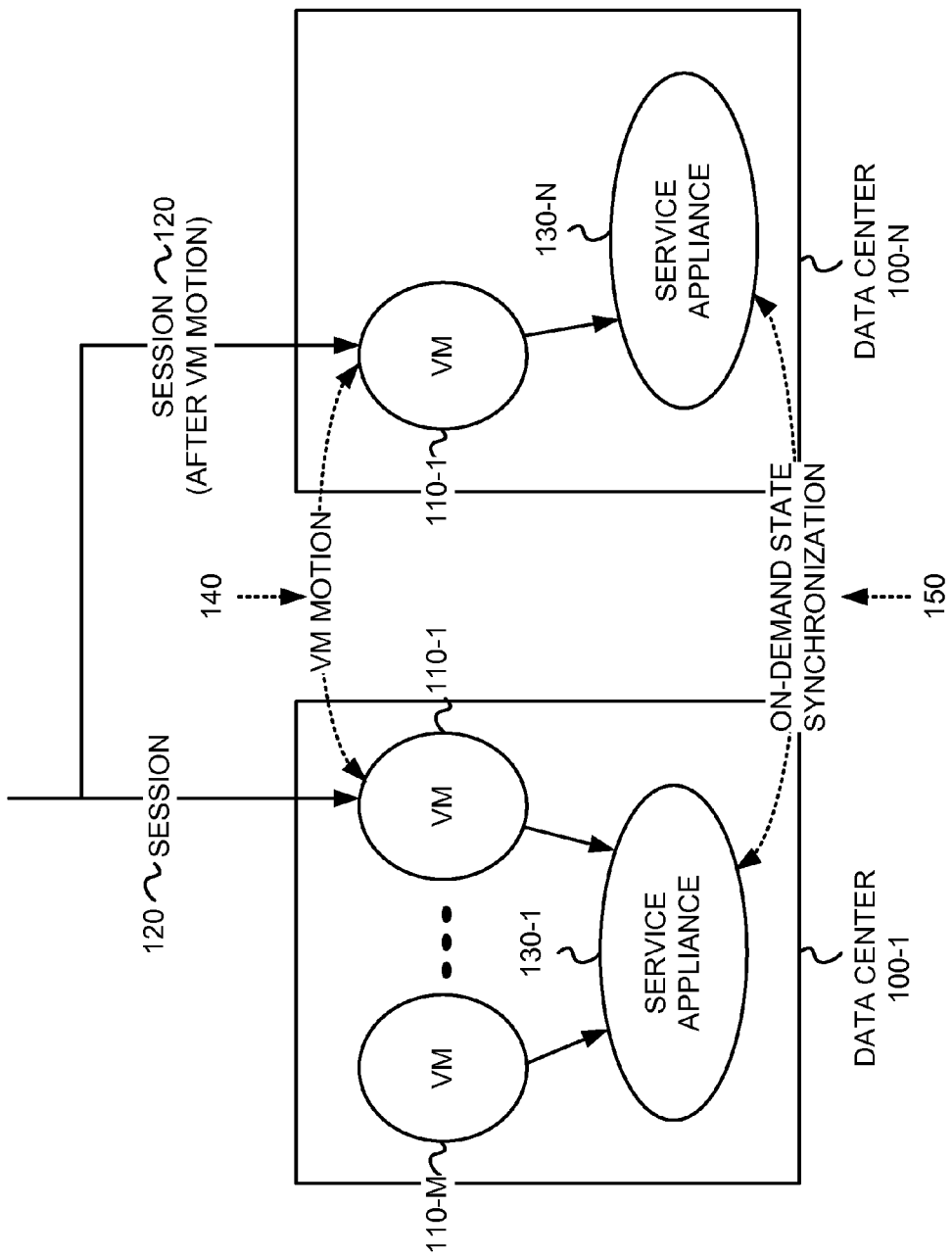
FIG. 1 illustrates an overview of example embodiments described herein in which a virtual machine (VM) may move from one data center to another data center.

FIG. 1 depicts an overview of embodiments described herein in which a virtual machine (VM) may move from one data center to another data center. As shown, a data center 100-1 may implement one or more virtual machines 110-1 through 110-M. Virtual machine 110-1 may handle a session 120. Session 120 may involve data received from, for example, a client that is external to data centers 100-1 through 100-N. Session 120 may relate to, for example, a specific operation or function requested by the client to be performed by data center 100-1. During the handling of session 120, VM 110-1 may use service appliance 130-1 for executing certain services related to the handling of session 120. For example, service appliance 130-1 may execute firewall, VPN, IDP, WAN optimization, UTM, and/or server load balancing services. Though only one service appliance is depicted in FIG. 1, service appliance 130-1 may include a cluster of multiple, different service appliances.

A data center management device (not shown) may determine that virtual machine 110-1 should move to another data center, and may instruct virtual machine 110-1 to move to data center 100-N. The data center management device may determine that virtual machine 110-1 should move to another data center based on a number of different reasons. Such reasons may include, but are not limited to, distributing data center load during peak usage periods, handling disaster recovery situations, saving on power and cooling costs, or to better utilize the underlying physical machines of the data centers. Upon receipt of instructions from the data center management device, virtual machine 110-1 may engage in VM motion 140 to move to data center 100-N. VM motion 140 may include the exporting of files, objects, etc. from data center 100-1 to data center 100-N such that VM 110-1 may be implemented at data center 100-N.

Subsequent to movement of VM 110-1 from data center 100-1 to data center 100-N, VM 110-1 may continue to handle session 120, and may use service appliance 130-N for executing the services related to the handling of session 120. Synchronization of state related to session 120 between service appliance 130-1 and service appliance 130-N permits service appliance 130-N to continue, where service appliance 130-1 left off, in executing the services related to the handling of the session. The state information that may be synchronized may include, but is not limited to, policy information related to session 120, a user account name of the user associated with session 120, session state information, an Internet Protocol (IP) address related to the session (e.g., IP address of VM 110-1, data center 100-1, data center 100-N).

Example Network

Figure 2:
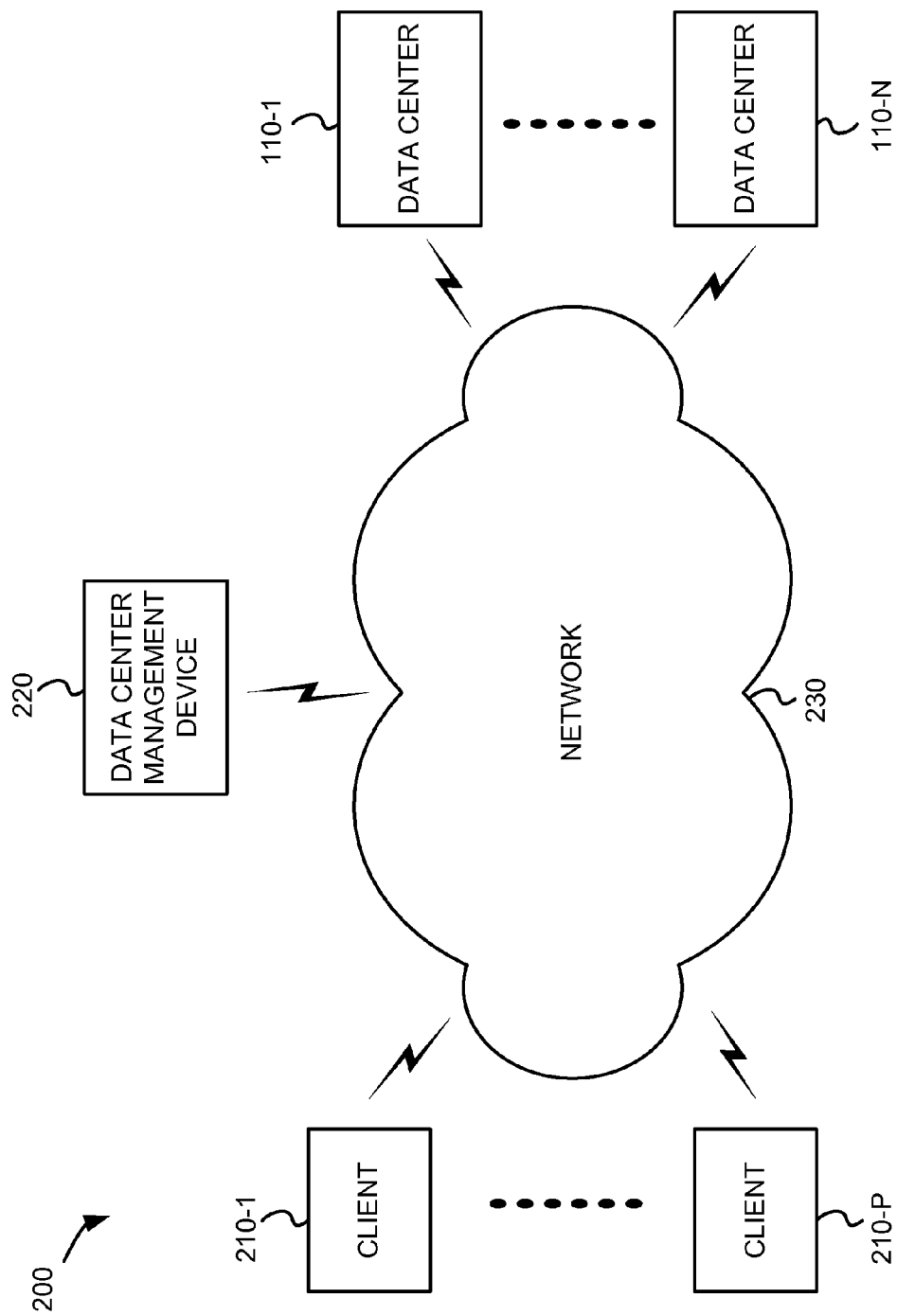
FIG. 2 illustrates an example network in which virtual machine mobility may occur between data centers.

FIG. 2 illustrates an example network 200 in which VM mobility may occur between data centers. Network 200 may include data centers 110-1 through 110-N (individually and generically referred to herein as "data center 110"), clients 210-1 through 210-P (individually and generically referred to herein as "client 210"), data center management device 220, and network 230.

Data centers 110-1 through 110-N may each include components, such as, for example, racks of servers for implementing consolidated data centers. Each of data centers 110-1 through 110-N may, though, include any type of physical system or device that is capable of implementing one or more virtual machines.

Clients 210-1 through 210-P may include client entities that may engage in sessions with data center 110-1 through 110-N. Clients 210-1 through 210-P may include, for example, desktop, laptop or palmtop computers, a cellular radiotelephone, a personal digital assistant (PDA), etc. The sessions may relate to a specific operation or function requested by the client to be performed by a data center 100. Data center management device 220 may include a device (e.g., a server device) that may manage virtual machine mobility between data centers 110-1 through 110-N, and may also manage service appliance state synchronization between data centers 110-1 through 110-N. In some implementations, an entity other than data center management device 220 may manage some aspects of the mobility between data centers 110-1 through 110-N. For example, a network device other than data center management device 220 may be responsible for managing the operation of service appliances 130 while data center management device 220 may be responsible for the overall operation of data centers 100. This additional network device and data center management device 220 may communicate with one another through a predetermined application programming interface (API). As a particular example of this implementation, consider the situation in which a vendor-specific control device is responsible for controlling service appliances manufactured by that vendor. Data center management device 220 may notify the vendor-specific control device which may in turn control the service appliances manufactured by that vendor.

Network 230 may include any type of network, such as a local area network (LAN), a wide area network (WAN), a telephone network (e.g., the Public Switched Telephone Network (PSTN) or a cellular network), an intranet, the Internet, or a combination of networks. Clients 210-1 through 210-P, data center management device 220, and data centers 110-1 through 110-N may connect to network 230 via wired and/or wireless connections.

The components of network 200 depicted in FIG. 2 are examples. Network 200 may include fewer, additional, different and/or differently arranged components than are shown in FIG. 2. Additionally, or alternatively, one or more of the components depicted in FIG. 2 may perform one or more of the tasks described as being performed by one or more other components of FIG. 2.

Data Center

Figure 3:
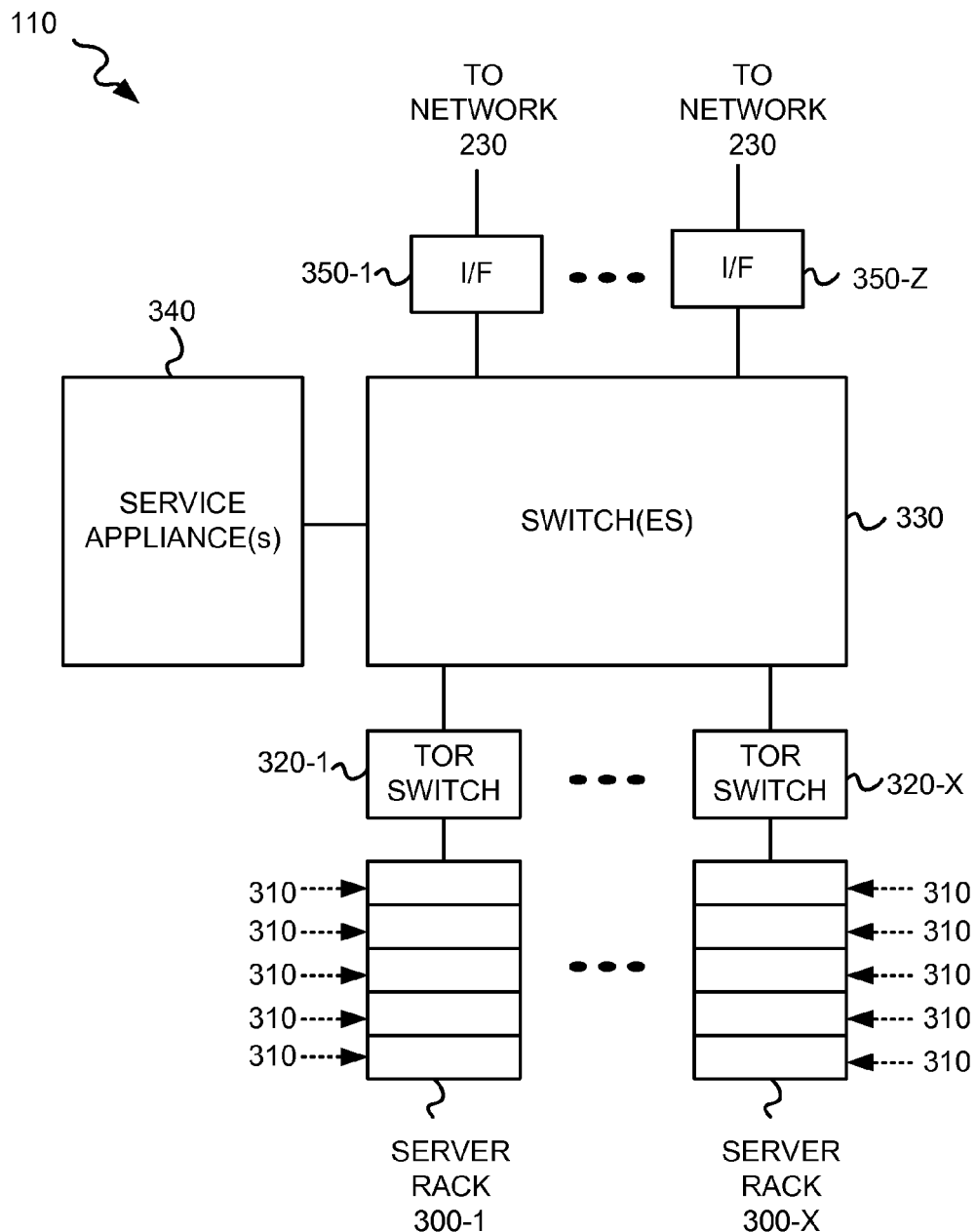
FIG. 3 illustrates example components of the data center of FIGS. 1 and 2.

FIG. 3 illustrates example components of a data center, such as one of data centers 110. As shown, data center 110 may include multiple server racks 300-1 through 300-X (where X is an integer greater than or equal to one), Top of Rack (TOR) switches 320-1 through 320-X (where X is any positive integer), switch(es) 330, service appliance(s) 340, and interfaces 350-1 through 350-Z (where Z is any positive integer).

Server racks 300-1 through 300-X may each include a rack of multiple servers 310 which are interconnected with a respective TOR switch 320. Each one of servers 310 may include a server entity that may implement one or more virtual machines.

TOR switches 320-1 through 320-X may each include a switch that switches traffic from servers 310 of a respective server rack 300 to switch(es) 330. Switch(es) 330 may include one or more switches for switching traffic from server racks 300-1 through 300-X to service appliance(e) 340 and/or to network 230. Service appliance(s) 340 may include one or more service appliances that may execute services related to handling sessions between data center 110 and respective clients 210-1 through 210-P. Service appliance(s) 340 may execute services such as, for example, firewall, VPN, IDP, WAN optimization, UTM, and/or server load balancing services. Interfaces 350-1 through 350-Z may include components for interfacing switch(es) 330 with network 230. For example, interfaces 350-1 through 350-Z may receive data from switch(es) 330 and transmit the data to network 230, and may further receive data from network 230 and forward the data to switch(es) 330. TOR switches 320 may also switch traffic between servers in a server rack 300.

The components of data center 110 depicted in FIG. 3 are examples. Data center 110 may include fewer, additional, different and/or differently arranged components than are shown in FIG. 3. Additionally, or alternatively, one or more of the components depicted in FIG. 3 may perform one or more of the tasks described as being performed by one or more other components of FIG. 3.

Figure 4A:
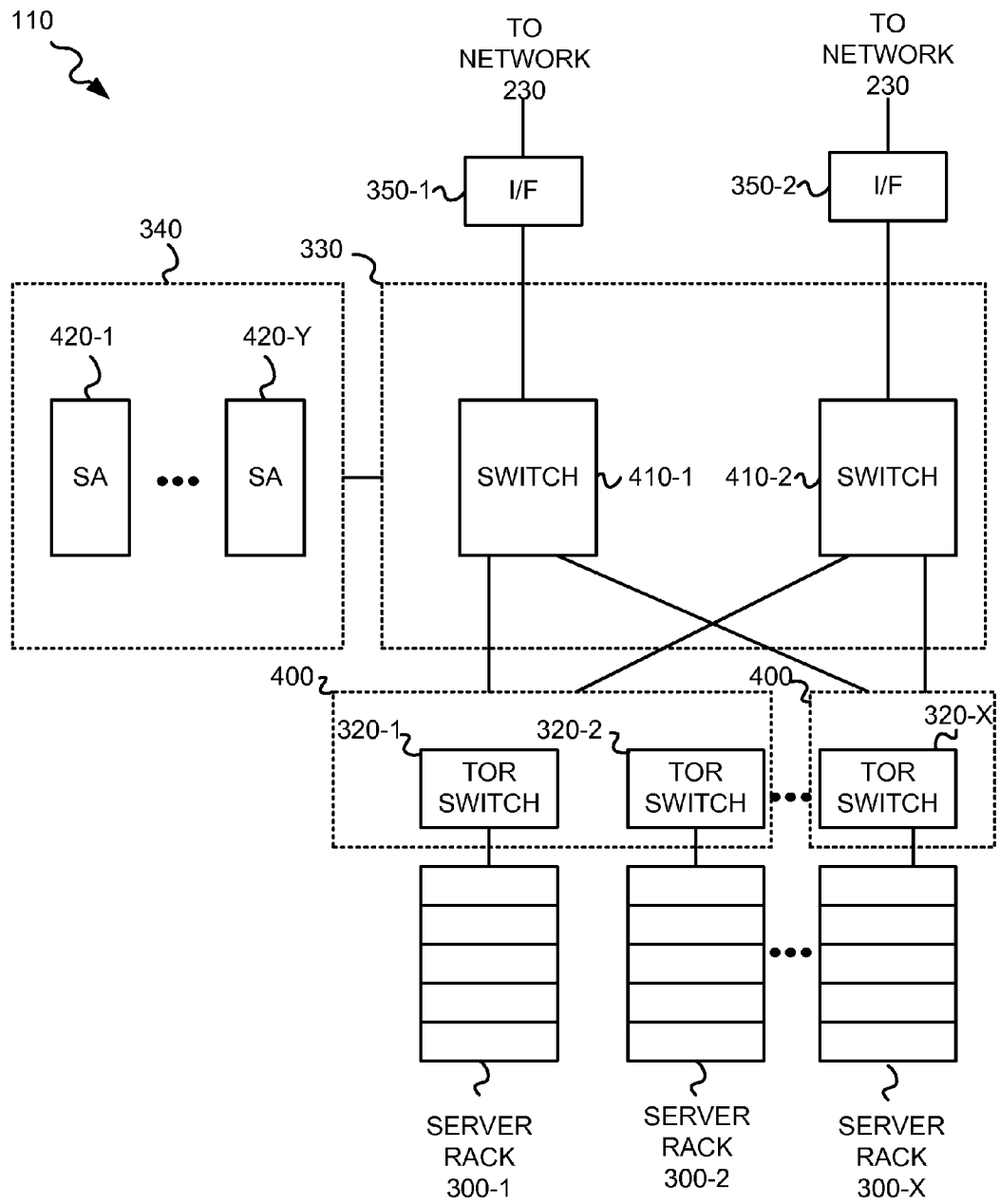
FIG. 4A illustrates components of a first example embodiment of the data center of FIG. 3.

FIG. 4A depicts components of a first example embodiment of data center 110 of FIG. 3. In the example embodiment of FIG. 4A, TOR switches 320-1 through 320-X may grouped together as "virtual chassis" 400, and switch 330 of FIG. 3 may include switches 410-1 and 410-2. Each virtual chassis 400 includes a connection to each of switches 410-1 and 410-2. Furthermore, service appliance(s) 340 is depicted as including multiple service appliances 420-1 through 420-Y (where Y is a positive integer greater than one).

Figure 4B:
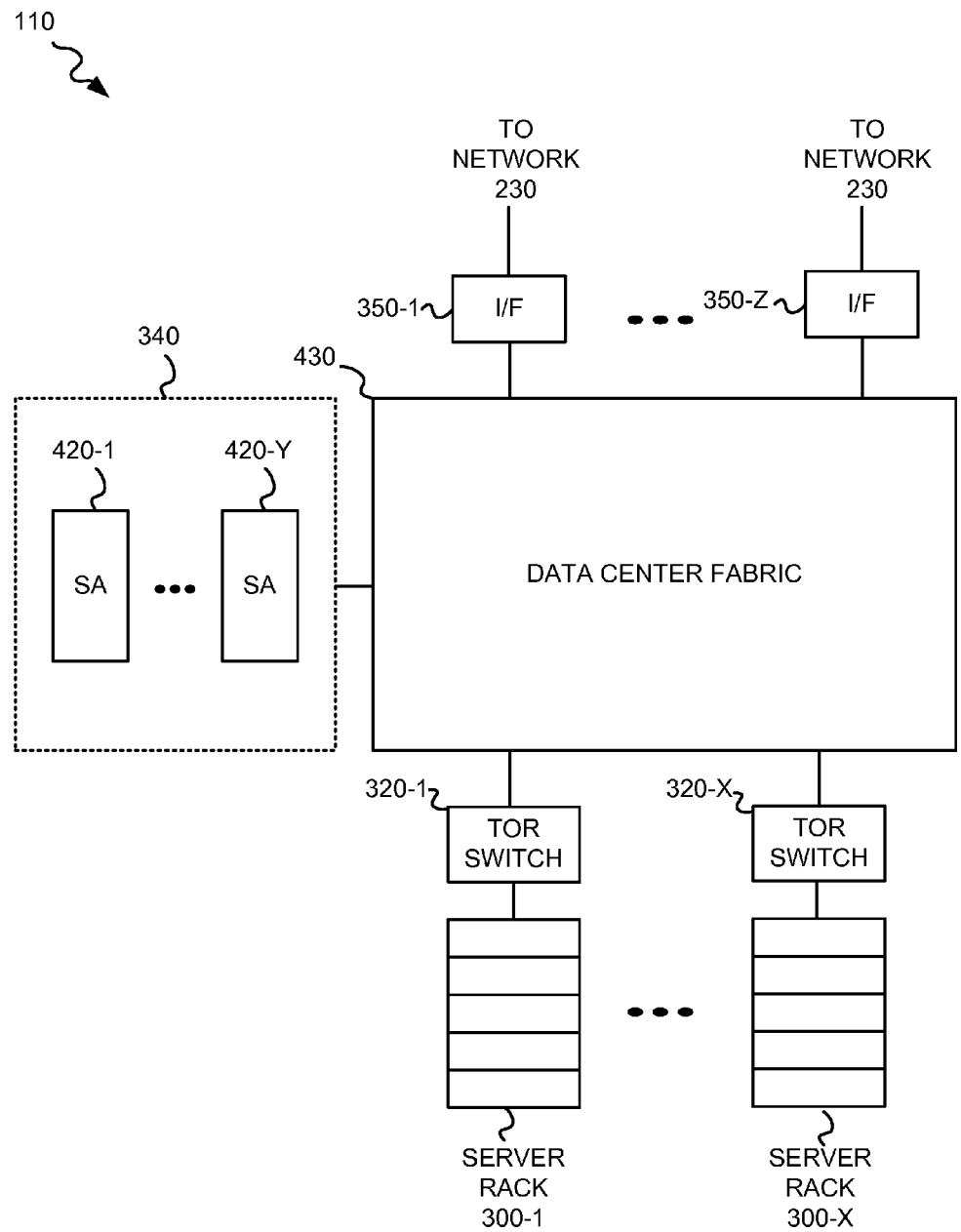
FIG. 4B illustrates components of a second example embodiment of the data center of FIG. 3.

FIG. 4B depicts components of a second example embodiment of data center 110 of FIG. 3. In the example embodiment of FIG. 4B, switch(es) 330 is replaced with a data center fabric 430 that includes one or more switching planes to facilitate data switching between server racks 300-1 through 300-X and network 230. The switching planes may include, for example, a three-stage switch of crossbar elements. Other types of switching planes may, however, be used in data center fabric 430.

Data Center Management Device Components

FIG. 5 is a diagram of example components of data center management device 220. As shown in FIG. 5, data center management device 220 may include a bus 510, a processor 520, a main memory 530, a read only memory (ROM) 540, a storage device 550, an input device 560, an output device 570, and a communication interface 580.

Bus 510 may include a path that permits communication among the components of data center management device 220. Processor 520 may include a processor, a microprocessor, or processing logic (e.g., an application specific integrated circuit (ASIC) or a field programmable gate array (FPGA)) that may interpret and execute instructions. Main memory 530 may include a random access memory (RAM) or another type of dynamic storage device that may store information and instructions for execution by processor 520. ROM 540 may include a ROM device or another type of static storage device that may store static information and instructions for use by processor 520. Storage device 550 may include a magnetic and/or optical recording medium and its corresponding drive, or a removable form of memory, such as a flash memory.

Input device 560 may include a mechanism that permits a user to input information to data center management device 220, such as a keyboard, a mouse, a button, a pen, a touch screen, voice recognition and/or biometric mechanisms, etc. Output device 570 may include a mechanism that outputs information to the user, including a display, a light emitting diode (LED), a speaker, etc. Communication interface 580 may include any transceiver-like mechanism that enables data center management device 220 to communicate with other devices and/or systems. For example, communication interface 580 may include mechanisms for communicating with another device or system via a network, such as network 230.

As will be described in detail below, data center management device 220 may perform certain operations relating to controlling VM mobility at data centers 110-1 through 110-N. Data center management device 220 may perform these operations in response to processor 520 executing software instructions contained in a computer-readable medium, such as memory 530. A computer-readable medium may be defined as a logical or physical memory device. A logical memory device may include a space within a single physical memory device or spread across multiple physical memory devices.

The software instructions may be read into memory 530 from another computer-readable medium, such as storage device 550, or from another device via communication interface 580. The software instructions contained in memory 530 may cause processor 520 to perform processes that will be described later. Alternatively, hardwired circuitry may be used in place of or in combination with software instructions to implement processes described herein. Thus, implementations described herein are not limited to any specific combination of hardware circuitry and software.

The components of data center management device 220 depicted in FIG. 5 are examples. Data center management device 220 may include fewer, additional, different and/or differently arranged components than are shown in FIG. 5. Additionally, or alternatively, one or more of the components depicted in FIG. 5 may perform one or more of the tasks described as being performed by one or more other components of FIG. 5.

Additionally, as previously discussed, data center management device 220, although shown as single entity in FIG. 5, may be implemented by a number of different devices. For example, data center management device 220 may be implemented as a hierarchical set of devices, which may be geographically distributed. Higher level management devices in the hierarchical set of devices may delegate control functions of a particular device in data center 100 to a lower level management device that is assigned to the particular device in the data center (e.g., vendor-specific control devices may perform the control functions under the control of a higher level device in the hierarchical set of devices). As used herein, data center management device 220 may refer to one or more control devices.

Data Center Management Device Functional Diagram

FIG. 6 is a diagram that depicts example functional components of data center management device 220. The functional components of data center management device 220 may include a VM motion determination unit 600 and a VM motion controlling unit 610. The functional components of FIG. 6 may be implemented by processor 520 of device 220.

VM motion determination unit 600 of data center management device 220 may determine whether virtual machines should be moved from one data center to another data center. VM motion determination unit 600 may determine that a virtual machine should move to another data center based on a number of different reasons. Such reasons may include, but are not limited to, distributing data center load during peak usage periods, handling disaster recovery situations, saving on power and cooling costs, or to better utilize the underlying physical machines of the data centers. The determination performed by VM motion determination unit 600 may be performed automatically or in response to a manual command entered by an operator.

VM motion controlling unit 610 may issue instructions, via network 230, based on the determination from VM motion determination unit 600, to cause one or more virtual machines to move from one data center to another data center, called a VM move operation. The VM move operation is illustrated in more detail with respect to the flow chart of FIG. 7. In general, a VM move operation may include notifying the affected service appliances 130, synchronizing the service appliance states, and replicating the VM that is being moved at the new data center.

The functional components of data center management device 220 depicted in FIG. 6 are examples. Data center management device 220 may include fewer, additional, different and/or differently arranged functional components than are shown in FIG. 6. Additionally, or alternatively, one or more of the functional components depicted in FIG. 6 may perform one or more of the functions described as being performed by one or more other functional components of FIG. 6.

Data Center VM Mobility Process

Figure 7:
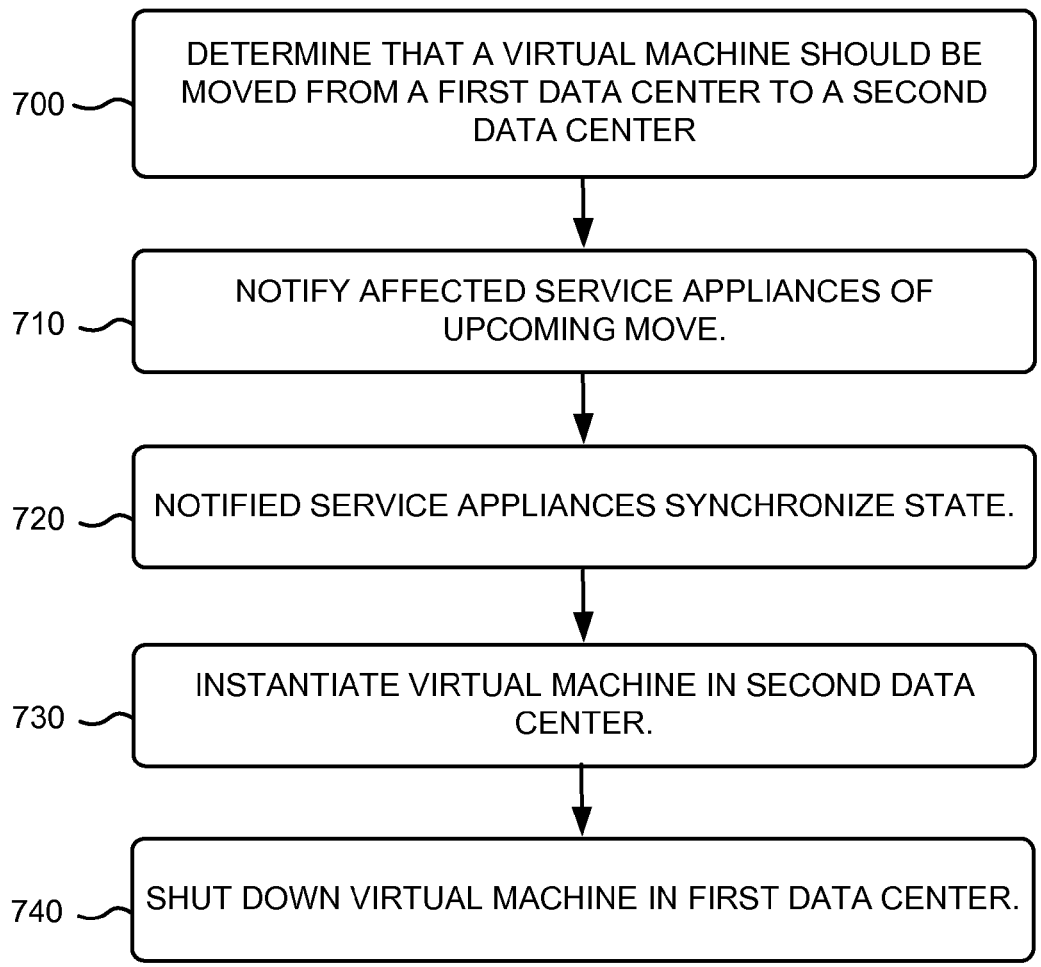
FIG. 7 is a flow chart that illustrates an example process for moving a virtual machine from a first data center to a second data center, and for synchronizing the state of service appliances in the second data center with the state of the service appliances in the first data center.

FIG. 7 is a flow chart that illustrates an example process for moving a VM from a first data center to a second data center. The example process of FIG. 7 may be implemented by data center management device 220 in conjunction with devices in a data center 100. Data center management device 220 may, for instance, issue instructions to the data centers 100 to perform the process of FIG. 7.

The example process may include determining that a virtual machine should be moved from a first data center to a second data center (block 700). For example, VM motion determination unit 600 of data center management device 220 may determine that a virtual machine should move to another data center based on a number of different reasons. Such reasons may include, for example, distributing data center load during peak usage periods, handling disaster recovery situations, saving on power and cooling costs, or to better utilize the underlying physical machines of the data centers. VM motion determination unit 610 may make the VM move determination automatically or based on a manually entered user command.

VM motion determination unit 600 may receive reports from respective data centers of the data center's current or projected loads, the status of the respective data centers (e.g., data center entering a hibernation or failure mode), or a power or temperature status of the respective data centers. Additionally, a lack of reports received at VM motion determination unit 600 from respective data centers may be used in determining whether a virtual machine should be moved from a first data center to a second data center. For example, if a certain status report for a given data center is received at data center management device 220 for a specified period of time, VM motion determination unit 600 may determine that the data center has incurred some sort of failure, indicating that the virtual machine should be moved to another data center. VM motion determination unit 600 may, thus, have knowledge of the current or projected loads of multiple data centers, the status of the multiple data centers, and/or a power or temperature status of the multiple data centers that may be used in determining whether a virtual machine should be moved from a first data center, and to select an appropriate second data center to which the virtual machine should be moved.

Data center management device 220 may notify the affected service appliances (i.e., the service appliances responsible for the first VM and the service appliances that will be responsible for the second VM) of the upcoming move (block 710). In response to the notification, the notified service appliances may synchronize the state of the virtual machine (block 720). For instance, the service appliance(s) associated with the virtual machine may transfer state information relating to the virtual machine to the second service appliance. In some implementations, during state synchronization of the service appliances, the session being handled by the virtual machine may be suspended until the movement is completed and until service appliance state synchronization is also completed.

The process may further include instantiating the virtual machine in the second data center (block 730). Instantiating the virtual machine in the second data center may include transferring all the information necessary to reproduce the state of the virtual machine to the second data center and starting operation of the virtual machine at the second data center. When the virtual machine in the second data center begins operation, the virtual machine may be placed in "hot-standby mode," which may allow the virtual machine in the second data center to begin processing traffic as soon as the switchover occurs. Data center management device 220 may control the instantiation of the virtual machine in the second data center. In one implementation, a virtual machine "hypervisor" may control the instantiation of the virtual machine. A hypervisor, also called a virtual machine monitor (VMM), may implement the control application through which multiple guest operating systems can execute at a host computer. In general, the hypervisor may take an image of the memory of the virtual machine at the first data center and the counterpart hypervisor in the second data center may instantiate a clone of the memory image at the second data center.

The process may further include shutting down the virtual machine in the first data center (block 740). Data center management device 220 may, for example, control the first data center to remove or delete the virtual machine from the first data center.

CONCLUSION

As described herein, a first service appliance at a first data center, from which a virtual machine is being moved, and a second service appliance at a second data center, to which the virtual machine is being moved, may perform on-demand state synchronization related to a session being handled by the virtual machine, upon movement of the virtual machine. The on-demand state synchronization enables the second service appliance to continue executing a service related to handling of the session that was previously performed by the first service appliance. The on-demand state synchronization described herein is scalable and eliminates the need for the brute force method of constant state synchronization. The service appliances involved in VM mobility may, thus, provide seamless service delivery for a session even when the session handling virtual machine moves between data centers.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While a series of blocks has been described in FIG. 7, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   determining, by a device, that a virtual machine should be moved from a first physical system to a second physical system;
   sending, from the device, a first set of instructions to one or more service appliances at the first physical system;
   sending, from the device, the first set of instructions to one or more service appliances at the second physical system,
      the first set of instructions instructing the one or more service appliances at the first physical system and the one or more service appliances at the second physical system to perform state synchronization, and
      a first session associated with the virtual machine being suspended during the state synchronization;
   sending, from the device and after performance of the state synchronization, a second set of instructions to instantiate a copy of the virtual machine in the second physical system;
   instantiating, by the device, the copy of the virtual machine at the second physical system, the copy of the virtual machine beginning a second session and processing data upon instantiation,
      the instantiation being based on an image, the image being:
         associated with a memory of the virtual machine,
         captured while the virtual machine is located at the first physical system, and
         used to generate another image, based on the image, to instantiate the copy of the virtual machine at the second physical system; and
   shutting down, by the device, the virtual machine at the first physical system, the device, when shutting down of the virtual machine, being further to:
      remove the virtual machine from the first physical system.

2. The method of claim 1, further including:
   synchronizing, based on the first set of instructions and at the service appliances, a state describing operation of the virtual machine.

3. The method of claim 1, where information corresponding to the state synchronization includes at least one of:
   policy information related to the first session being handled by the virtual machine,
   a user account name of a user associated with the first session,
   state information associated with the first session, or
   one or more Internet protocol addresses related to the first session.

4. The method of claim 1, where the service appliances implement at least one of a firewall service, an Internet Protocol Security (IPSec) service, a Virtual Private Network (VPN) service, a Wide Area Network (WAN) optimization service, a load balancing service, an Intrusion Detection and Prevention (IDP) service, or a Unified Threat Management (UTM) service.

5. The method of claim 1, where the first physical system comprises a first data center and where the second physical system comprises a second data center.

6. The method of claim 1, where a first service appliance services the first session, the first service appliance being located at the first physical system.

7. The method of claim 6, where a second service appliance services the second session, the second service appliance being located at the second physical system.

8. The method of claim 1, where sending the second set of instructions to instantiate a copy of the virtual machine in the second physical system includes sending the image to a hypervisor in the second physical system.

9. A device comprising:
   a memory to store instructions; and
   a processor to execute the instructions to:
      determine that a virtual machine should be moved from a first physical system to a second physical system,
      instruct, based on a first set of instructions transmitted to a first service appliance at the first physical system and a second service appliance at the second physical system, the first service appliance at the first physical system to perform state synchronization with the second service appliance at the second physical system,
         the first service appliance and the second service appliance implementing at least one of a firewall service, an Internet Protocol Security (IPSec) service, a Virtual Private Network (VPN) service, a Wide Area Network (WAN) optimization service, a load balancing service, an Intrusion Detection and Prevention (IDP) service, or a Unified Threat Management (UTM) service, and
         a first session associated with the virtual machine being suspended during the state synchronization; and
      cause, after performance of the state synchronization, instantiation of a copy of the virtual machine at the second physical system,
         the copy of the virtual machine beginning a second session and processing data upon instantiation, and
         the instantiation being based on an image, the image being:
            associated with a memory of the virtual machine,
            captured while the virtual machine is located at the first physical system, and
            used to generate another image, based on the image, to instantiate the copy of the virtual machine at the second physical system; and
      shut down the virtual machine in the first physical system, the processor, when shutting down the virtual machine, being further to:
remove the virtual machine from the first physical system.

10. The device of claim 9, where the processor is further to execute the instructions to:
send the image to a hypervisor in the second physical system.

11. The device of claim 9, where the state includes policy information related to at least one of:
the first session being handled by the virtual machine,
a user account name of a user associated with the first session,
state information associated with the first session, or
one or more Internet protocol addresses related to the first session.

12. The device of claim 9, where the first physical system comprises a first data center and where the second physical system comprises a second data center.

13. The device of claim 9, where the first service appliance services the first session prior to movement of the virtual machine from the first physical system to the second physical system.

14. The device of claim 9, where the second service appliance services the second session at the second data center subsequent to instantiation of the copy of the virtual machine at the second physical system.

15. A system comprising:
a first server to implement a virtual machine, the virtual machine handling a session at a first data center; and
a first service appliance to:
execute a service related to the session, the service including at least one of a firewall service, an Internet Protocol Security (IPSec) service, a Virtual Private Network (VPN) service, a Wide Area Network (WAN) optimization service, a load balancing service, an Intrusion Detection and Prevention (IDP) service, or a Unified Threat Management (UTM) service,
receive first instructions to perform state synchronization for the virtual machine with a second service appliance in a second data center,
the first instructions being received by the second service appliance, and
the session associated with the virtual machine being suspended during the state synchronization, and
perform, based on the received first instructions, the state synchronization with the second service appliance, the virtual machine receiving second instructions to cause a copy of the virtual machine to be instantiated at a second server at the second data center, the instantiation being based on an image, the image being:
associated with a memory of the virtual machine,
captured while the virtual machine is located at the first data center, and
used to generate another image, based on the image, to instantiate the copy of the virtual machine at the second data center,
the first server being further to:
remove the virtual machine from the first data center.

16. The system of claim 15, where the virtual machine and the first service appliance receive the first instructions and the second instructions from a data center management device that is external to the system.

17. The system of claim 15, where the state includes at least one of:
policy information related to the session,
a user account name of a user associated with the session,
state information associated with the session, or
one or more network addresses related to the session.

18. The system of claim 17, where the one or more network addresses include Internet Protocol (IP) addresses associated with the first data center or the second data center.

19. The system of claim 15, where the server shuts down the virtual machine at the first data center.

20. The system of claim 15, where the first instructions cause the first service appliance and the second service appliance to perform the state synchronization with one another.

21. The system of claim 15, where the first instructions and the second instructions are received from a hierarchically arranged data center management device.

* * * * *